United States Patent [19]
Sato et al.

[11] Patent Number: 5,186,325
[45] Date of Patent: Feb. 16, 1993

[54] CASSETTE CASE AND INDEX SHEET

[75] Inventors: Kiyoto Sato; Kazuki Nakamaru, both of Miyagi, Japan

[73] Assignee: Sony Corporation, Tokyo, Japan

[21] Appl. No.: 917,518

[22] Filed: Jul. 17, 1992

Related U.S. Application Data

[63] Continuation of Ser. No. 647,811, Jan. 30, 1991, abandoned.

[30] Foreign Application Priority Data

Jan. 31, 1990 [JP] Japan ............................. 2-008606[U]

[51] Int. Cl.$^5$ ............................................. B65D 85/672
[52] U.S. Cl. ..................................... 206/232; 206/387
[58] Field of Search ................. 206/387, 444, 232, 307

[56] References Cited

U.S. PATENT DOCUMENTS

| | | | |
|---|---|---|---|
| 3,746,180 | 7/1973 | Spiroch et al. | 206/387 |
| 4,119,200 | 10/1978 | Cassidy et al. | 306/387 |
| 4,235,334 | 11/1980 | Ahn | 206/387 |
| 4,304,331 | 12/1981 | Minkow | 206/387 |
| 4,648,507 | 3/1987 | Komiyama et al. | |
| 4,651,876 | 3/1987 | Tanuma et al. | 206/387 |
| 4,771,888 | 9/1988 | Lundeen | 206/387 |
| 4,838,421 | 6/1989 | Mastronardo | 206/387 |

FOREIGN PATENT DOCUMENTS

| | | |
|---|---|---|
| 2079394 | 11/1971 | France . |
| 1293311 | 10/1972 | United Kingdom . |
| 2100221A | 12/1982 | United Kingdom . |

*Primary Examiner*—Paul T. Sewell
*Assistant Examiner*—Ted Kavanaugh
*Attorney, Agent, or Firm*—Philip M. Shaw, Jr.

[57] ABSTRACT

A cassette case is constructed such that a tape cassette is supported to a lid side by utilizing guiding protrusions provided on the side portions of the tape cassette. Also, a recess portion is formed on the inner surface of the casing so as to accommodate therein a thick portion which forms a front opening portion of the tape cassette, thereby a thickness of the entirety of the cassette case being reduced. Further, in an index sheet inserted into the cassette case, a portion corresponding to the recess portion formed in the inside of the casing is formed as a recess-shaped portion, and thus this index sheet is suitably applied to the above-mentioned thin cassette case.

5 Claims, 3 Drawing Sheets

CASSETTE CASE AND INDEX SHEET

This is a continuation of co-pending application Ser. No. 07/647,811 filed on Jan. 30, 1991 now abandoned.

BACKGROUND OF THE INVENTION

1. Field of the Invention

The present invention relates to a cassette case for accommodating therein a tape cassette and an index sheet used therefor.

2. Description of the Prior Art

In general, a tape cassette employed for audio use and so on is accommodated and preserved in a plastic case when it is not in use. FIG. 1 generally shows an example of such conventional cassette case.

As shown in FIG. 1, a cassette case 21 is adapted to accommodate therein an audio compact cassette (hereinafter simply referred to as a tape cassette) 31 which is now widely available on the market. This cassette case 21 is composed of a casing 22 provided as a cassette case body and a lid 23, and the casing 22 and the lid 23 are pivoted by a hinge 24 so as to become freely openable and closable.

On the casing 22 side, engaging protrusions 25a, 25b are formed, which are inserted into reel shaft insertion apertures 32a, 32b of the tape cassette 31 for preventing reel hubs (not shown) in the tape cassette 31 from being rotated inadvertently, while a cassette supporting portion 26 is provided on the lid 23 side in order to support the tape cassette 31.

Conventionally, the cassette supporting portion 26 of the lid 23 is shaped as a bag (pocket-like shape) and is constructed such that, when the tape cassette 31 is inserted into the bag-shaped cassette supporting portion 26 from a front opening portion (i.e., a magnetic tape exposing portion into which a magnetic head, a pinch roller and so on are inserted) 33, the tape cassette 31 is supported therein so as to be rotated integrally with the lid 23, thus the tape cassette 31 being loaded onto and/or unloaded from the cassette casing 22 with ease.

In FIG. 1, reference numeral 27 designates an index sheet which is for use with this cassette case 21 and in which a musical program or the like is written. This index sheet 27 is inserted into the cassette case 21 under the condition such that it is sandwiched between the lid 23 and the tape cassette 31.

The thus constructed conventional cassette case encounters the following problems:

1. Since the cassette supporting portion 26 of the lid 23 is shaped as the bag and the tape cassette 31 is inserted into this bag-shaped cassette supporting portion 26 from its front opening portion 33 side to be supported therein, it is difficult to reduce the thickness of the cassette case 21. More specifically, since a trapezoid-shaped thick portion 34 is formed on the top and rear surfaces of the front opening portion 33 side of the tape cassette 31 so as to form the front opening portion 33, the cassette supporting portion 26 which receives this thick portion 34 requires a space (i.e., thickness) sufficient so that this thick portion 34 can be inserted thereto. As a consequence, the overall thickness of the cassette case 21 cannot be reduced.

2. Defective molds tend to occur in the molding-process of the lid 23. More specifically, when the lid 23 having the bag-shaped cassette supporting portion 26 is molded, because of the configuration of the bag-shaped cassette supporting portion 26, it is unavoidable that a metal mold apparatus whose cavity portion is formed by an upper mold 41, a lower mold 42 and a slide core 43 is employed as shown in FIG. 2. At the completion of the injection molding process, the upper mold 41 and the lower mold 42 are opened in the vertical direction and the slide core 43 are moved rearwardly in the lateral direction as shown by an arrow B, thereby to take out the molded product (lid). However, when the slide core 43 is moved rearwardly in the direction shown by the arrow B, a vacuum condition temporarily prevails in the bag-shaped cassette supporting portion 26 with the result that the molded product, which is not sufficiently cured, is deformed, which leads to the occurrence of defective molds.

Conventionally, Japanese Laid-Open Utility Model Gazette No. 60-163279 describes a cassette case which is intended to solve the problem 1 of the aforenoted problems. According to this previously-proposed cassette case, recess portions are respectively formed in the lid and the cassette casing so as to accommodate therein the thick portions of the tape cassette.

However, in this conventional cassette case, the cassette supporting portion of the lid is also shaped as the bag-like configuration which as a result cannot solve the above-described problem 2. Moreover, unavoidably, this cassette case is constructed such that the tape cassette is inserted into the cassette supporting portion of the lid from the direction opposite to the ordinary direction, that is, the tape cassette is inserted into the cassette supporting portion of the lid from its rear wall side (the side in which a mis-erase preventing tab is provided). In that event, the tape cassette is inserted into and/or taken out from the cassette case in the condition such that the front opening portion thereof is directed to the front side. There is then the large risk that the magnetic tape will be smudged by the fingers, incurring a serious problem in practical use.

Further, in such cassette case having the recess portions in which the thick portions of the tape cassette are accommodated, if the index sheet is inserted thereto, this index sheet hinders the thick portions of the tape cassette from being accommodated into the recess portions. Consequently, the index sheet should not be inserted into the cassette case or the index sheet must be formed small enough so as not to invade the recess portions of the cassette case, which considerably restricts the space of the index sheet in which the music program and so on are written.

OBJECTS AND SUMMARY OF THE INVENTION

Accordingly, it is an object of the present invention to provide an improved cassette case and index sheet in which the aforenoted shortcomings and disadvantages encountered with the prior art can be eliminated.

More specifically, it is an object of the present invention to provide a cassette case of thin type which can be molded well and in which a tape cassette can be accommodated from a front opening portion side.

It is another object of the present invention to provide an index sheet for use with the aforenoted cassette case and which is large in space.

As a first aspect of the present invention, a cassette case is provided, in which a lid is pivoted to a casing so as to become freely openable and closable and a predetermined tape cassette is accommodated into the inside thereof. This cassette case is comprised of engaging portions being formed on the lid so as to come in engagement with only guiding protrusions protrusively provided on left and right side portions of the tape cassette, the tape cassette being supported to the lid by the engaging portions, and recess portions being formed on the casing and the lid so as to accommodate therein a thick portion which forms a front opening portion of the tape cassette.

In accordance with a second aspect of the present invention, an index sheet is accommodated within a cassette case in which a lid is pivoted to a casing so as to become freely openable and closable and recess portions are formed on the casing and the lid so as to accommodate therein a thick portion which forms a front opening portion of a tape cassette accommodated within the inside of the cassette case. This index sheet is comprised of a portion formed by deforming its portion corresponding to the recess portion in a recess-shape.

The above, and other objects, features and advantages of the present invention will become apparent in the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

Figure 1:
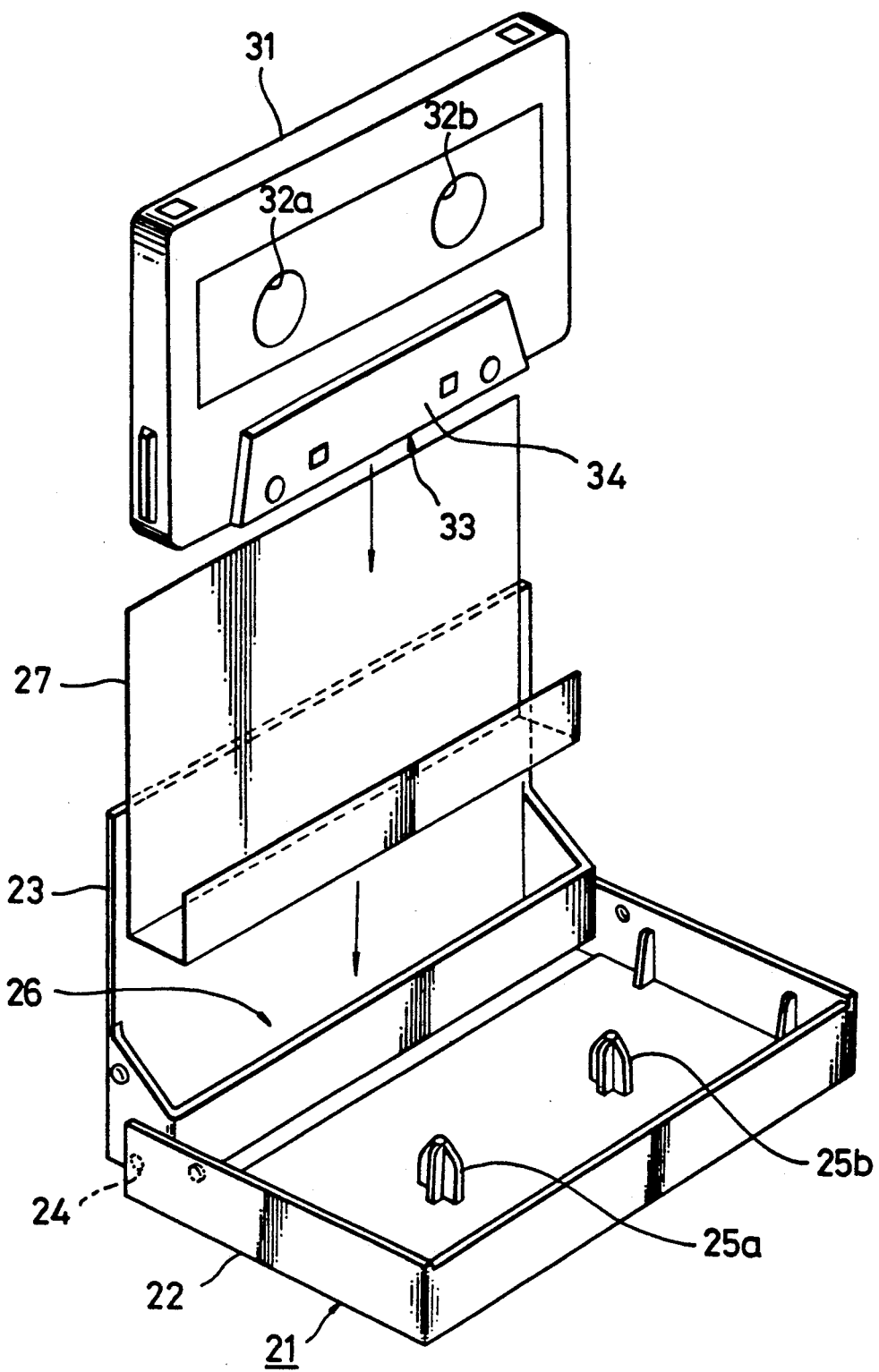
FIG. 1 is a perspective view illustrating a conventional cassette case and a conventional index sheet therefor.
Figure 2:
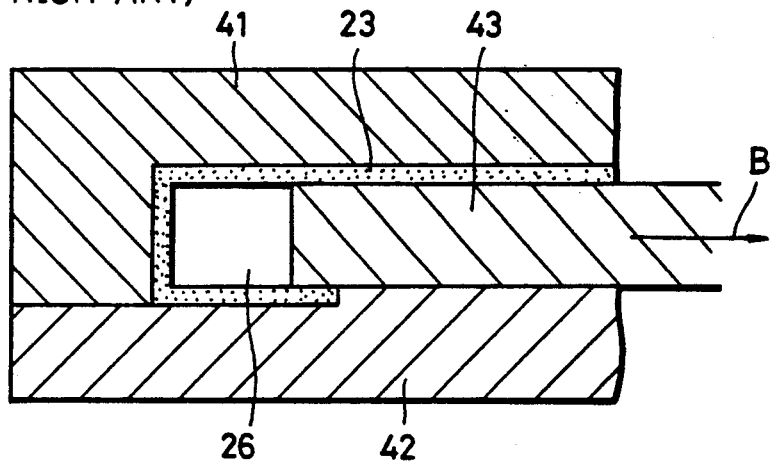
FIG. 2 is a schematic diagram to which references will be made in explaining a molding process of a lid of the conventional cassette case.
Figure 4:
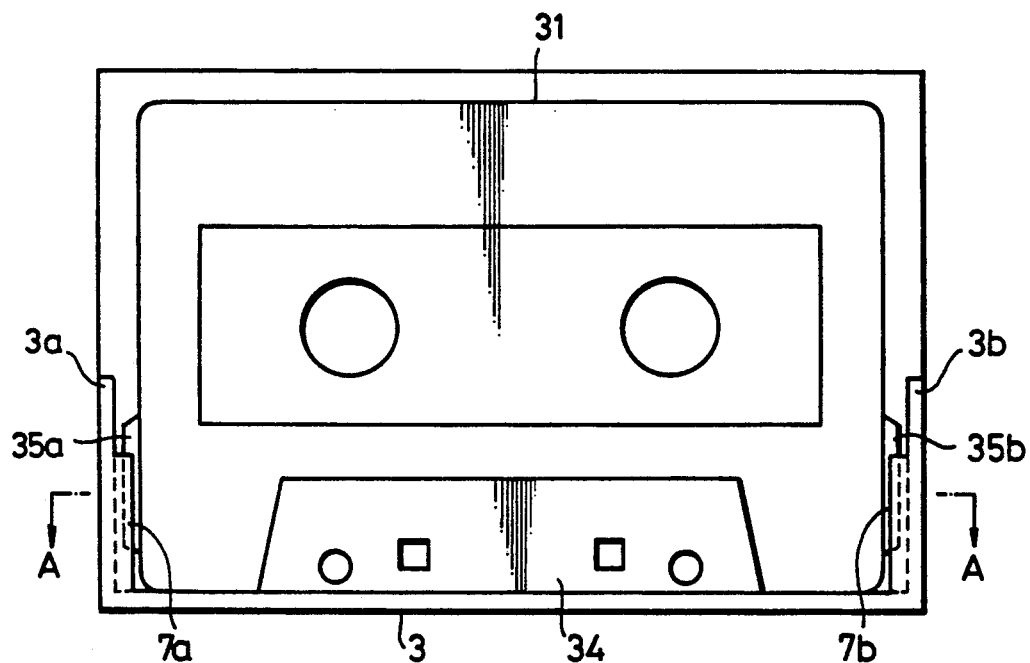
FIG. 4 is a front view of a lid of the cassette case shown in FIG. 3.
Figure 5:
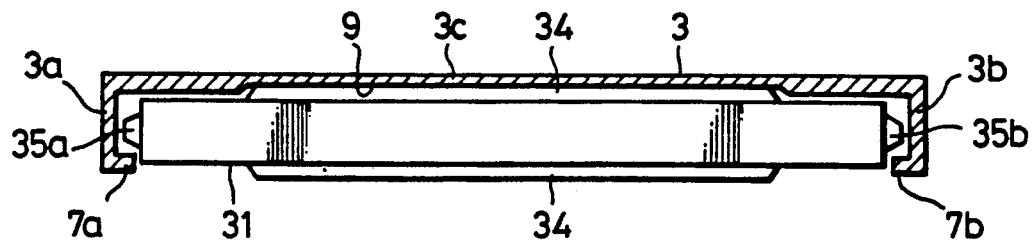
FIG. 5 is a cross-sectional view taken through the line A—A in FIG. 4.

An embodiment of a cassette case and index sheet therefor according to the present invention will now be described in detail with reference to FIGS. 3 to 5. Throughout FIGS. 3 to 5, like parts corresponding to those of FIG. 1 are marked with the same reference numerals and therefore need not be described in detail.

As illustrated, there is provided a cassette case which is generally designated by reference numeral 1. This cassette case 1 is composed of a casing 2 provided as a cassette case body and a lid 3, and the cassette casing 2 and the lid 3 are pivoted by a hinge 4 so as to become freely openable and closable. More specifically, shafts protrusively provided on the inner surface side of both left and right side walls 2a and 2b are respectively engaged with shaft apertures bored through outer surface side of both left and right side walls 3a and 3b of the lid 3, whereby the lid 3 can be opened and closed about the hinge 4 relative to the casing 2.

Engaging protrusions 5a and 5b are formed on the casing 2 side, and these engaging protrusions 5a and 5b are respectively inserted into reel shaft insertion apertures 32a and 32b of the tape cassette 31 to thereby prevent the reel hubs (not shown) of the tape cassette 31 from being rotated inadvertently. On the other hand, the cassette supporting portion 6 is provided on the lid 3 side so as to support therein the tape cassette 31.

In the cassette case 1 of this embodiment, the cassette supporting portion 6 of this lid 6 is not formed as the bag-like shape unlike the prior art but it is constructed in such a fashion that the tape cassette 31 is supported to the lid 3 by utilizing guiding protrusions 35a and 35b protrusively provided on both side portions of the tape cassette 31.

More precisely, these guiding protrusions 35a and 35b are provided on the side walls of the tape cassette 31 according to the standards of audio compact cassette. In association therewith, in the cassette supporting portion 6 of this embodiment, engaging wall portions 7a and 7b are formed on the left and right side walls 3a and 3b of the lid 3 so as to slightly protrude inwardly from the top edges of the side walls 3a and 3b so that, when the tape cassette 31 is inserted into the cassette supporting portion 6 from the front opening portion 33 side, these engaging walls portions 7a and 7b oppose the front of the guiding protrusions 35a and 35b, thus urging the tape cassette 31 to become in engagement with the lid 3 (see FIGS. 4 and 5).

As described above, the tape cassette 31 is supported to the cassette supporting portion 6 of the lid 3, whereby the tape cassette 31 is rotated to be opended and closed in unison with the lid 3. Thus, the tape cassette 31 can be inserted into and taken out from the casing 2 with ease.

Further, in this cassette case 1, on main wall portions 2c and 3c of the casing 2 and the lid 3 facing the front and rear surfaces of the tape cassette 31, recess portions 8 and 9 are formed so as to accommodate therein the thick portion 34 of trapezoid configuration which constructs the front opening portion 33 of the tape cassette 31. These recess portions 8 and 9 are formed in the inside portions of the casing 2 and the lid 3, that is, near the hinge 4 side in such a fashion that the thick portion 34 can be accommodated within the recess portions 8 and 9 under the condition such that the tape cassette 31 is inserted into the cassette supporting portion 6 of the lid 3 from the front opening portion 33 side. The outer surfaces of the main wall portions 2c and 3c are made flat.

According to the aforementioned arrangement, the cassette case 1 of this embodiment is of the thin type such that a spacing between the main wall portions 2c and 3c in the condition that the casing 2 and the lid 3 are closed is slightly larger than the thickness of parts other than the thick portion 34 of the tape cassette 31.

Figure 3:
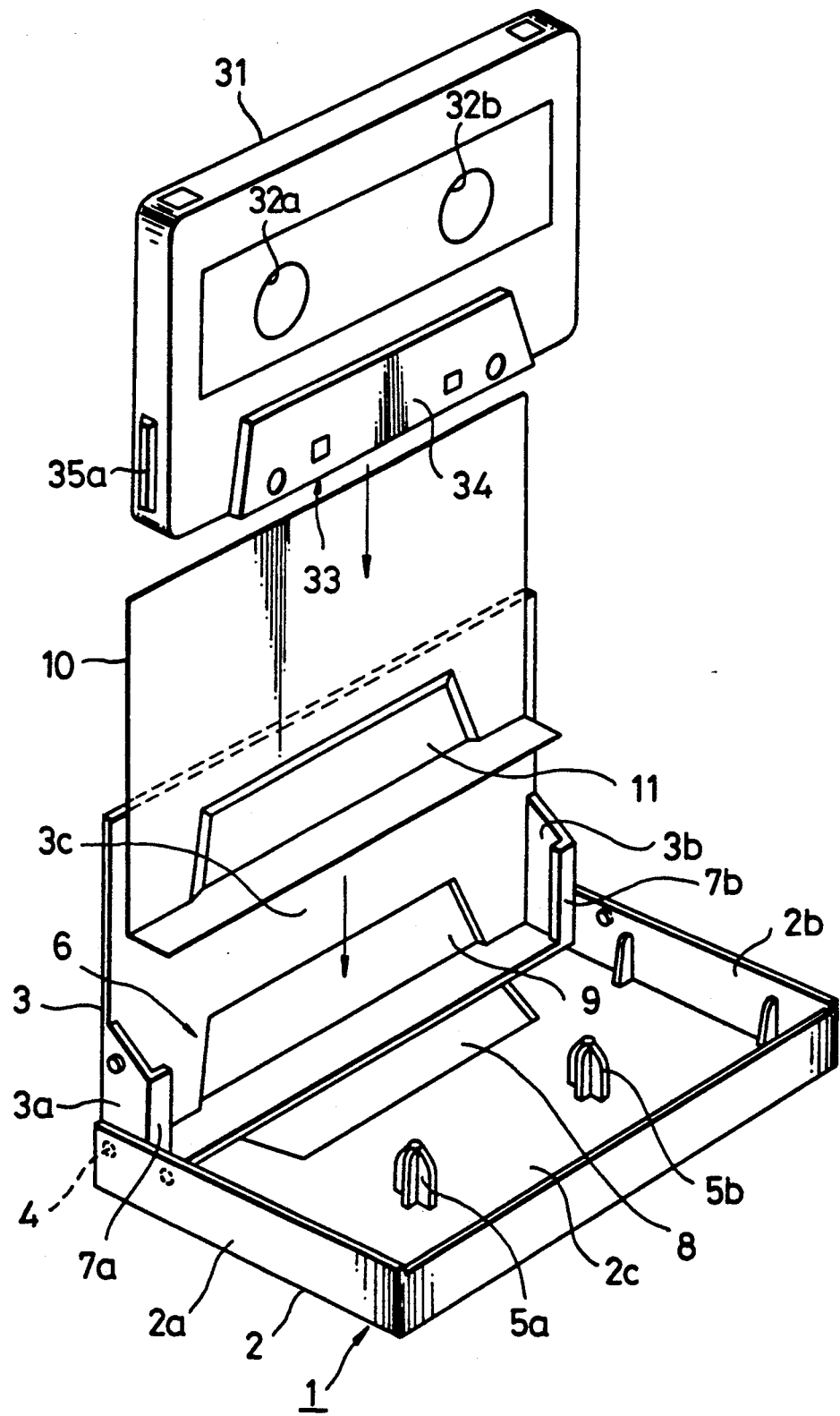
FIG. 3 is a perspective view of an embodiment of a cassette case and index sheet therefor according to the present invention.

In FIG. 3, reference numeral 10 designates an index sheet, and this index sheet 10 is inserted into the cassette case 1 under the condition such that it is sandwiched between the lid 3 and the tape cassette 31. This index sheet 10 has on its portion corresponding to the thick portion 34 of the tape cassette 31 formed a recess-like portion 11 whose configuration is matched with the thick portion 34. The recess-shaped portion 11 is formed on the index sheet 10 from the rear side of the index sheet 10, that is, from the tape cassette 31 side by a press-treatment with the result that a convex-shaped portion corresponding to this recess-shaped portion 11 is formed on the front surface of the index sheet 10 though not shown.

Since the index sheet 10 is provided with the recess-shaped portion 11 corresponding to the recess portion 9 of the lid 3 as described above, the tape cassette 31 can be accommodated into the cassette case 1 without being troubled by the index sheet 10. In the above, the recess-shaped portion 11 may be simply cut away.

Incidentally, in the above-described arrangement, the casing 2 of the cassette case 1 is generally made of a transparent or opaque plastic material, the lid 3 is made of a transparent plastic material and the index sheet 10 is made of a paper having a predetermined hardness, respectively. The index sheet 10 is not shown in FIGS. 4 and 5.

As described above, according to the cassette case 1 of this embodiment, the structure of the cassette supporting portion 6 of the lid 3 is not shaped as the bag unlike the prior art but the cassette supporting portion 6 is constructed such that the tape cassette 31 is engaged with and supported by the lid 3 by utilizing the guiding protrusions 35a and 35b of the tape cassette. Also, the recess portions 8 and 9 are formed on the casing 2 and the lid 3 so as to accommodate therein the thick portion 34 of the tape cassette 31. Therefore, the overall thickness of the cassette case 1 can be considerably reduced as compared with the standard cassette case so that a space for preserving the tape cassette can be saved.

Further, the cassette supporting portion 6 of the lid 3 is not shaped as the bag-like configuration so that, when the lid 3 is molded by the use of the metal mold apparatus having the slide core, the occurrence of the vacuum condition can be avoided unlike the prior art to thereby prevent defective molds from being produced in the molded product, that is, the lid 3, thus to improve the quality of the cassette case 1.

Furthermore, this cassette case 1 is constructed such that the tape cassette 31 is inserted into the cassette supporting portion 6 of the lid 3 from the front opening portion 33 side of the tape cassette 31, that is, the tape cassette 31 is inserted into the cassette supporting portion 6 under the condition such that the rear surface portion side of the tape cassette 31 is faced to the front side similarly to the standard cassette case. There is then no risk that, in the insertion of the tape cassette 31 into the cassette supporting portion 6 of the lid 3, the magnetic tape will be smudged by fingers.

In addition, since the index sheet 10 used in this cassette case 1 has on its portion corresponding to the recess portion 9 of the lid 3 formed the recess-shaped portion 11, the thick portion 34 of the tape cassette 31 can be accommodated into the recess portion 9 without being disturbed by the index sheet 10. Thus, the area of this index sheet 10 can be made large enough to cover the tape cassette 31 similarly to the standard index sheet.

Having described a preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

We claim as our invention:

1. A cassette case in which a lid is pivoted to a casing so as to become freely openable and closable and accommodate therein a predetermined tape cassette, the cassette case comprising:

engaging portions formed on the lid so as to engage only guiding protrusions on left and right side portions of the tape cassette, the tape cassette thereby being captured against the lid by the engaging portions; and recess portions formed on the casing and the lid so as to accommodate therein a thick portion which forms a front opening portion of the tape cassette.

2. A cassette case according to claim 1, in which the recess portions are formed on the lid and the casing at positions near a hinge portion side of the lid relative to the casing.

3. A cassette case according to claim 1, in which the engaging portions are formed on the lid at its position near a hinge portion relative to the casing.

4. A cassette case according to claim 1, in which outer surfaces of main wall portions of the casing and the lid are formed flat having no concavity and convexity.

5. A cassette case according to claim 1, in which the thickness of the main wall portions corresponding to the recess portions is thinner than the thickness of portions of the main wall portions other than the portions corresponding to the recess portions.

* * * * *